US011242092B2

(12) United States Patent
Yamazaki et al.

(10) Patent No.: US 11,242,092 B2
(45) Date of Patent: Feb. 8, 2022

(54) VEHICLE SIDE BODY STRUCTURE

(71) Applicant: Mazda Motor Corporation, Hiroshima (JP)

(72) Inventors: Tadashi Yamazaki, Hiroshima (JP); Takeshi Nakamura, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/816,529

(22) Filed: Mar. 12, 2020

(65) Prior Publication Data

US 2020/0398899 A1 Dec. 24, 2020

(30) Foreign Application Priority Data

Jun. 18, 2019 (JP) .............................. JP2019-112697

(51) Int. Cl.
| | |
|---|---|
| *B62D 25/02* | (2006.01) |
| *B62D 25/04* | (2006.01) |
| *B62D 21/15* | (2006.01) |

(52) U.S. Cl.
CPC ......... *B62D 25/025* (2013.01); *B62D 21/157* (2013.01); *B62D 25/04* (2013.01)

(58) Field of Classification Search
CPC ...... B62D 25/02; B62D 25/04; B62D 25/025; B62D 21/157; B62D 27/02; B62D 27/023
USPC ............................. 296/209, 193.06, 187.12
See application file for complete search history.

(56) References Cited

U.S. PATENT DOCUMENTS

| | | | | |
|---|---|---|---|---|
| 10,150,511 B2* | 12/2018 | Iyoshi | .................... | B62D 25/20 |
| 2006/0158008 A1 | 7/2006 | Nagashima | | |
| 2010/0270830 A1* | 10/2010 | Maruyama | ........... | B62D 25/025 |
| | | | | 296/209 |
| 2012/0086238 A1* | 4/2012 | Tan | ...................... | B62D 25/025 |
| | | | | 296/209 |

(Continued)

FOREIGN PATENT DOCUMENTS

| | | |
|---|---|---|
| DE | 102017211160 A1 | 1/2019 |
| FR | 3050165 A1 | 10/2017 |
| JP | 2018118697 A | 8/2018 |

OTHER PUBLICATIONS

European Patent Office, Extended European Search Report Issued in Application No. 20162595.1, dated Sep. 22, 2020, Germany, 7 pages.

*Primary Examiner* — Dennis H Pedder
(74) *Attorney, Agent, or Firm* — Alleman Hall Creasman & Tuttle LLP

(57) ABSTRACT

To improve bending rigidity of a side sill against a load toward an inner side in a vehicle width direction during a lateral collision while suppressing a weight increase of thereof by providing minimum reinforcement, the side sill has a closed cross-sectional space extending in a vehicle longitudinal direction and includes a first upper reinforcing member that reinforces bending rigidity against a load toward the vehicle width inner side. The first upper reinforcing member is configured to be partially provided in a cross-sectional view that is perpendicular to a longitudinal direction of the side sill and to extend along a longitudinal direction of the side sill such that at least a part thereof overlaps a center pillar joined portion, to which a center pillar is joined, in a vehicle side view at a height position of the center pillar joined portion.

9 Claims, 6 Drawing Sheets

(56) References Cited

U.S. PATENT DOCUMENTS

2012/0248825 A1* 10/2012 Tamura .................. B62D 25/04
                                                          296/209
2019/0168815 A1*  6/2019 Wada ................... B62D 27/023

* cited by examiner

VEHICLE SIDE BODY STRUCTURE

TECHNICAL FIELD

The present invention relates to a vehicle side body structure including: a side sill that has a closed cross-sectional structure extending in a vehicle longitudinal direction; and a center pillar that has a closed cross-sectional structure extending upward from the side sill, and being formed with an opening at a position above the side sill and on each of front and rear sides of the center pillar.

BACKGROUND ART

During a lateral collision of a vehicle (hereinafter referred to as a "lateral collision"), depending on a colliding position of a colliding object with a vehicle side surface, a side sill receives a load toward an inner side in a vehicle width direction (that is, a load causing such bending deformation that a center pillar joined portion in a longitudinal direction of the side sill is displaced toward the inner side in the vehicle width direction in a vehicle plan view) in conjunction with the load applied from the center pillar toward the inner side in the vehicle width direction (a cabin side).

In order to protect an occupant against such a lateral collision, a side sill that is reinforced against the load toward the inner side in the vehicle width direction as described above is proposed in Patent Document 1 below, for example.

The side sill in Patent Document 1 includes a side sill reinforcement, and the side sill reinforcement includes, in the longitudinal direction of the side sill, a base member and an extending member that is coupled to a rear end portion of the base member.

The extending member has a coupled portion that is fixed to the base member, and the coupled portion is fixed to the rear end portion of the base member from the inner side in the vehicle width direction by welding or the like. In this way, a coupled portion between the extending member and the base member is reinforced by an overlapping structure between the coupled portion of the extending member and the rear end portion of the base member.

At least the coupled portion of the side sill in Patent Document 1 has the overlapping structure from an upper end to a lower end of the coupled portion, that is, as a whole along a cross-sectional shape that is perpendicular to the longitudinal direction of the coupled portion. Thus, the side sill in Patent Document 1 is preferred from the viewpoint of improving rigidity against the above-described load toward the inner side in the vehicle width direction. However, with increased needs for a light vehicle body weight for purposes of improving fuel economy and improving travel performance in recent years, a weight reduction of a vehicle body (the side sill) is desired while safety of the occupant against the lateral collision is secured.

PRIOR ART DOCUMENTS

Patent Documents

Patent Document 1: JP 2018-118697A

SUMMARY OF THE INVENTION

Problem to be Solved by the Invention

The present invention has been made in view of such a problem and therefore has a purpose of providing a vehicle side body structure capable of improving bending rigidity of a side sill against a load toward an inner side in a vehicle width direction during a lateral collision with minimum reinforcement of the side sill while suppressing a weight increase of the side sill.

Means for Solving the Problem

The present invention is a vehicle side body structure comprising: a side sill that has a closed cross-sectional structure extending in a vehicle longitudinal direction; and a center pillar that has a closed cross-sectional structure extending upward from the side sill, and being formed with an opening at a position above the side sill and each of front and rear sides of the center pillar. The side sill includes a reinforcing member that reinforces bending rigidity against a load toward an inner side in a vehicle width direction. The reinforcing member is partially provided in a cross-sectional view that is perpendicular to a longitudinal direction of the side sill, and extends along the longitudinal direction of the side sill such that at least a part thereof overlaps a center pillar joined portion, to which the center pillar is joined, in a vehicle side view at a height position of the center pillar joined portion.

With the above configuration, it is possible to improve the bending rigidity of the side sill against the load toward the inner side in the vehicle width direction during a lateral collision while suppressing a weight increase thereof by providing minimum reinforcement.

As an aspect of the present invention, the vehicle side body structure further includes: a plurality of crossmembers extending toward the inner side in the vehicle width direction from the side sill and separating from each other in the vehicle longitudinal direction; and in a closed cross-sectional space on the inside of the side sill, a section that partitions the closed cross-sectional space in a longitudinal direction at least in an upper portion corresponding to a height of the center pillar joined portion. The reinforcing member is provided across the crossmembers and the section.

With the above configuration, it is possible to suppress the weight increase of the side sill while improving a reinforcing effect on the side sill by the reinforcing member by using the crossmembers as existing vehicle body rigid members.

As an aspect of the present invention, the center pillar is joined to a portion of the side sill between the crossmembers in a vehicle body longitudinal direction.

With the above configuration, it is possible to improve bending rigidity of the reinforcing member by using rigidity of the crossmembers provided on front and rear sides of the center pillar, and, with provision of such a reinforcing member, it is possible to efficiently improve the bending rigidity of the side sill against the load during the lateral collision.

As an aspect of the present invention, a cross section of the reinforcing member that is perpendicular to the vehicle longitudinal direction has an L-shape.

With the above configuration, since the reinforcing member is formed in the L-shape, a ridgeline extending in the vehicle longitudinal direction can be defined. Thus, compared to a shape that extends in a flat plate shape in the vehicle longitudinal direction, for example, it is possible to improve the bending rigidity of the side sill against the load toward the inner side in the vehicle width direction during the lateral collision.

As an aspect of the present invention, the reinforcing member covers a ridgeline formed in the side sill and extending in the longitudinal direction from an internal space side of the side sill or from an outer side of the internal space in a cross-sectional view that is perpendicular to the longitudinal direction of the side sill.

With the above configuration, the ridgeline of the side sill is covered with the reinforcing member. In this way, the reinforcing member can overlap the ridgeline, which has the high bending rigidity against the load during the lateral collision, in the vehicle side view. Thus, it is possible to improve the reinforcing effect of the bending rigidity of the side sill against the load during the lateral collision by the reinforcing member.

As an aspect of the present invention, the reinforcing member is a first reinforcing member, the side sill includes a second reinforcing member, which extends upward from a rear portion of the side sill, in the rear portion thereof, and a rear portion of the first reinforcing member overlaps the second reinforcing member in the vehicle side view.

With the above configuration, the first reinforcing member can receive a lateral collision load in cooperation with the second reinforcing member and can disperse the received load toward the second reinforcing member side. Therefore, it is possible to improve the bending rigidity of the side sill.

Advantage of the Invention

According to the present invention, it is possible to improve the bending rigidity of the side sill against the load toward the inner side in the vehicle width direction during the lateral collision while suppressing the weight increase thereof by providing the minimum reinforcement.

MODES FOR CARRYING OUT THE INVENTION

Figure 1:
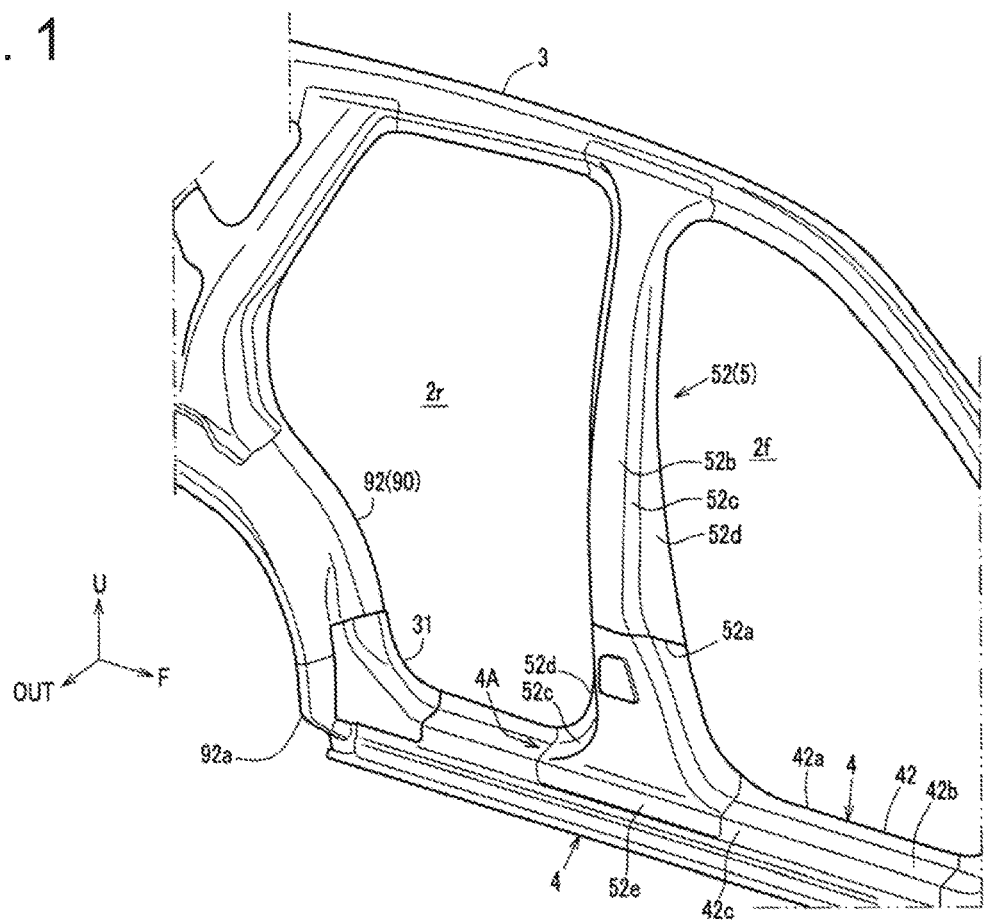
FIG. 1 is a perspective view in which a main section of a vehicle having a vehicle side body structure in this embodiment is seen from a right side of a vehicle body.

A detailed description will hereinafter be made on an embodiment of the present invention with reference to the drawings. In the drawings, an arrow F, an arrow U, and an arrow OUT respectively indicate a vehicle front direction, a vehicle up direction, and an outer side in a vehicle width direction (a vehicle right direction). In addition, in the following description, the outer side in the vehicle width direction (a cabin outer side) will be referred to as a "vehicle width outer side," and an inward direction in the vehicle width direction (a cabin inner side) will be referred to as a "vehicle width inner side." Note that a vehicle side body structure of this embodiment, which will be described below, is provided substantially and bilaterally symmetrical on left and right sides of a vehicle.

As illustrated in FIG. 1, side openings 2*f*, 2*r* are formed in a vehicle side body portion. A roof side rail 3 that extends in a longitudinal direction is provided along upper sides of the side openings 2*f*, 2*r*. A side sill 4 that extends in the longitudinal direction is provided along lower sides of the side openings 2*f*, 2*r*.

A center pillar 5 that extends in a vertical direction is provided at an intermediate position between the side openings 2*f*, 2*r* in a vehicle longitudinal direction. In the center pillar 5, an upper end is joined to an intermediate portion of the roof side rail 3, which extends in the vehicle longitudinal direction, and a lower end is joined to an intermediate portion of the side sill 4, which extends in the vehicle longitudinal direction.

In this way, the side openings 2*f*, 2*r* are partitioned into openings on vehicle front and rear sides by the center pillar 5 and are provided as entry and exit openings 2*f*, 2*r* (the front entry and exit opening 2*f* and the rear entry and exit opening 2*r*).

Figure 2:
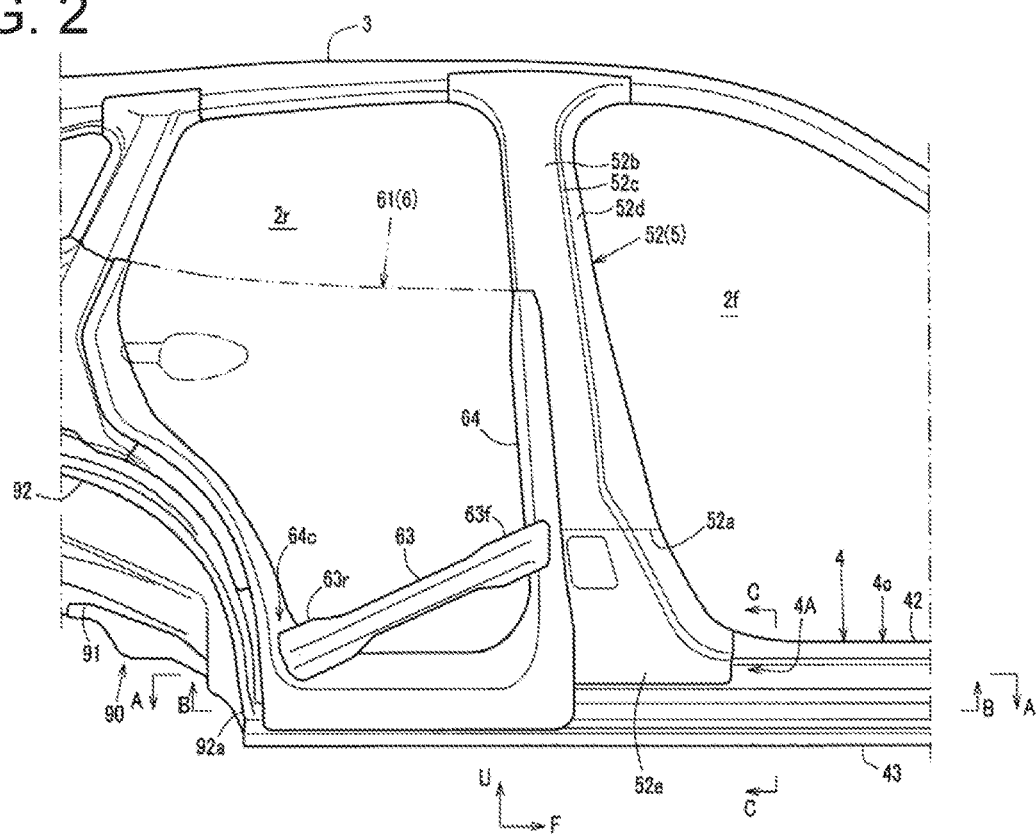
FIG. 2 is a right side view illustrating the main section of the vehicle having the vehicle side body structure in this embodiment.

The vehicle side body portion includes side doors that respectively open/close the front and rear entry and exit openings 2*f*, 2*r*. In FIG. 2, the side door on a front side (a front side door) is not illustrated while the side door on a rear side (a rear side door 6) is partially illustrated.

The rear side door 6 includes: a door body 61 constructed of a door outer panel, a door inner panel, and the like; and a plurality of impact bars 63 extending in the vehicle longitudinal direction. A front end of the rear side door 6 is supported by each of upper and lower portions of the center pillar 5 via an unillustrated hinge bracket.

The door body 61 is provided with an impact bar reinforcement 64 that extends along a rear side, a front side, and a lower side of the door body 61.

On the inside of the door body 61, the impact bars 63 are provided at different heights from each other and are each disposed between a front side and a rear side of the impact bar reinforcement 64 so as to couple the front side and the rear side thereof.

FIG. 2 only illustrates the impact bar 63 that is located the lowest of the impact bars 63. A description will hereinafter be made on the impact bar 63 located the lowest.

Figure 5:
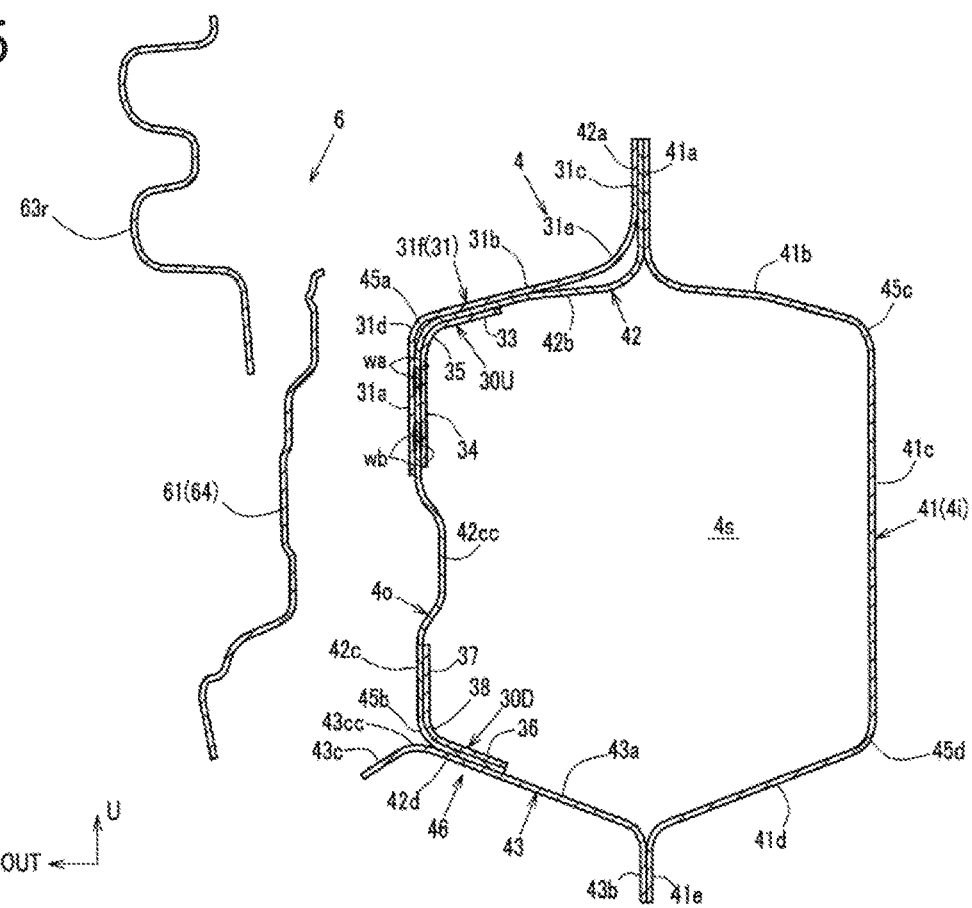
FIG. 5 is a cross-sectional view of the main section taken along line D-D in FIG. 3.

As illustrated in FIG. 2 and FIG. 5, the impact bar 63 is formed such that a cross section that is perpendicular to a longitudinal direction thereof has a substantially M-shape, and is respectively formed with a front flange 63*f* and a rear flange 63r, each of which is formed to be wider than an intermediate portion in the longitudinal direction, at front and rear ends.

In the impact bar 63, the front flange 63f and the rear flange 63r are respectively fixed to a lower portion of the front side of the impact bar reinforcement 64 and a corner portion 64c between a lower portion of the rear side of the impact bar reinforcement 64 and the lower side thereof by joint tools such as bolts.

In this way, the impact bar 63 is provided in a lower portion of the rear side door 6 in a manner to be tilted upward to the front and downward to the rear.

Here, a joint position of the rear flange 63r of the impact bar 63 to the rear side of the impact bar reinforcement 64 is located at a lower end of the lower portion of the rear side, that is, the corner portion 64c between the rear side and the lower side as described above.

Figure 3:
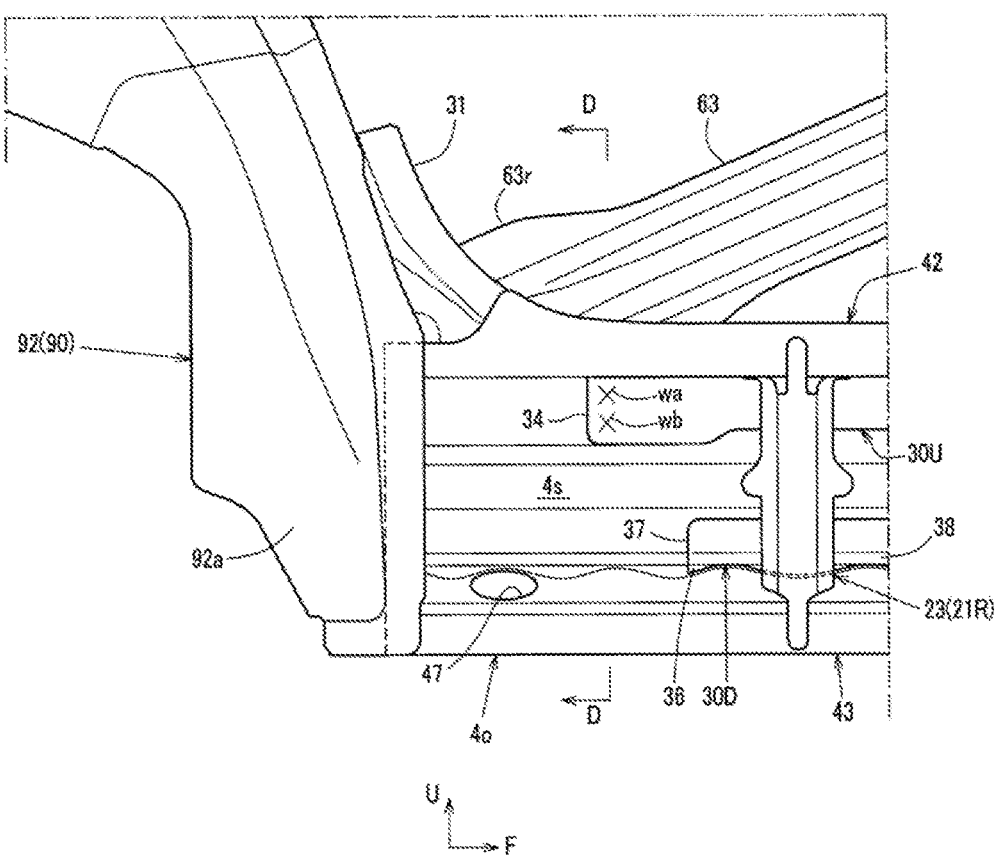
FIG. 3 is an enlarged view of the main section around a rear portion of a side sill from which a side sill inner is removed and which is seen from a vehicle width inner side.

In this way, as illustrated in FIG. 2, when the rear entry and exit opening 2r is closed by the rear side door 6 (hereinafter referred to as "when the rear side door 6 is closed"), in the impact bar 63, the front flange 63f of the impact bar 63 (that is, a joint portion thereof to the front side of the impact bar reinforcement 64) overlaps the center pillar 5 in a vehicle side view, and, as illustrated in FIG. 2, FIG. 3, and FIG. 5, the rear flange 63r of the impact bar 63 (that is, the joint portion to the corner portion 64c between the rear side and the lower side of the impact bar reinforcement 64) overlaps a rear portion of the side sill 4 in the vehicle side view.

Figure 12:
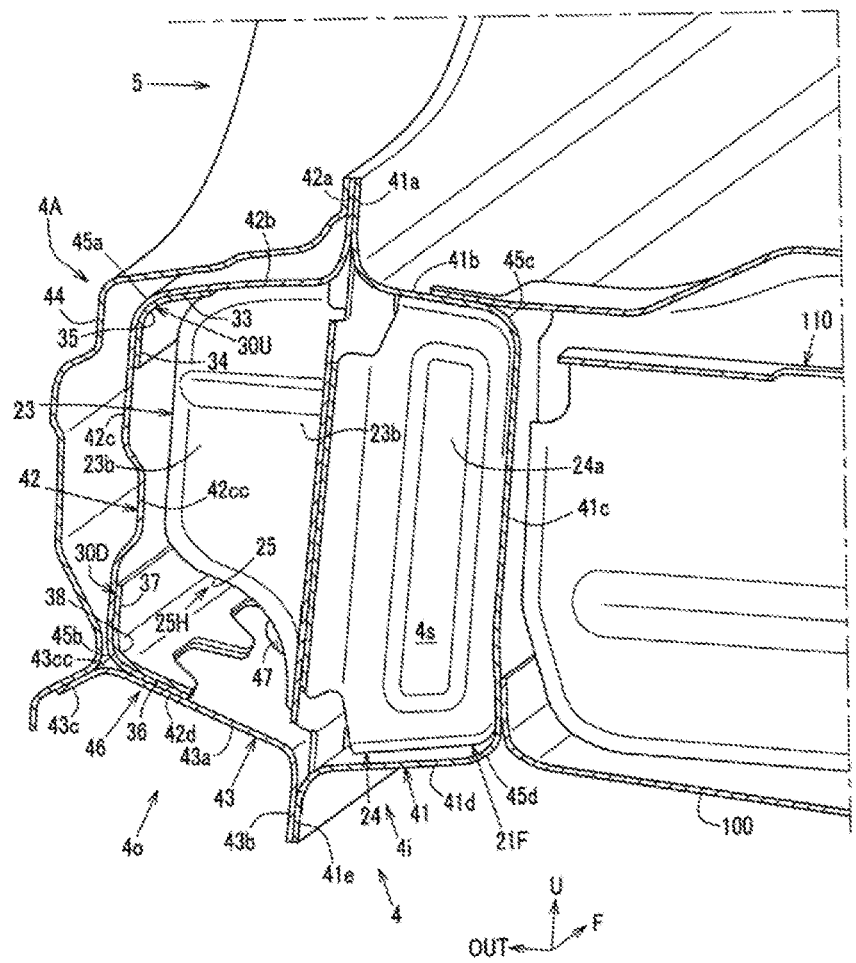
FIG. 12 is a perspective cross-sectional view illustrating the main section of the vehicle side body structure corresponding to an arrow direction of C-C in FIG. 2.

As illustrated in FIG. 5 and FIG. 12, the side sill 4 is a vehicle body rigid member that has a closed cross-sectional space 4s extending in the vehicle longitudinal direction, and includes: a first member 41, a second member 42, and a third member 43 constituting the closed cross-sectional space 4s; and an exterior panel 44 (only illustrated in FIG. 12) attached to the vehicle width outermost side of the side sill 4.

As a side sill inner 4i formed in a hat shape whose perpendicular cross section to the vehicle longitudinal direction is projected toward the vehicle width inner side, the first member 41 is provided on the vehicle width inner side of the side sill 4. More specifically, the first member 41 is integrally formed by including an upper end flange 41a extending in the vertical direction, an upper wall 41b extending toward the vehicle width inner side from a lower end of the upper end flange 41a, an inner wall 41c extending downward from a vehicle width inner end of the upper wall 41b, a lower wall 41d extending toward the vehicle width outer side from a lower end of the inner wall 41c, and a lower end flange 41e extending downward from a vehicle width outer end of the lower wall 41d.

As a side sill outer 4o formed in a hat shape whose perpendicular cross section to the vehicle longitudinal direction is projected to the vehicle width outer side, the second member 42 and the third member 43 are provided on the vehicle width outer side of the first member 41.

More specifically, the second member 42 is integrally formed by including an upper end flange 42a located in an upper portion and an intermediate portion in the vertical direction of the side sill outer 4o and extending in the vertical direction, an upper wall 42b extending toward the vehicle width outer side from a lower end of the upper end flange 42a, an outer wall 42c extending downward from an vehicle width outer end of the upper wall 42b, and a lower end flange 42d extending toward the vehicle width inner side from a lower end of the outer wall 42c. The third member 43 is integrally formed by including a lower wall 43a located in a lower portion of the side sill outer 4o and extending toward the vehicle width inner side and a lower end flange 43b extending downward from a vehicle width inner end of the lower wall 43a.

The upper end flanges 41a, 42a of the first member 41 and the second member 42 as well as the lower end flanges 41e, 43b of the first member 41 and the third member 43 are integrally joined to each other by spot welding or the like. Furthermore, the lower end flange 42d of the second member 42 is joined to the lower wall 43a of the third member 43 from above (a side of the closed cross-sectional space 4s).

In this way, the side sill 4 constitutes the closed cross-sectional space 4s therein by the upper wall 41b, the inner wall 41c, and the lower wall 41d of the first member 41, the upper wall 42b and the outer wall 42c of the second member 42, and the lower wall 43a of the third member 43. In addition, in the side sill 4, ridgelines 45a, 45b, 45c, 45d extending in the vehicle longitudinal direction are respectively defined between the upper wall 42b and the outer wall 42c, between the outer wall 42c and the lower end flange 42d, between the upper wall 41b and the inner wall 41c, and between the inner wall 41c and the lower wall 41d. Of these ridgelines 45a, 45b, 45c, 45d, the ridgeline 45a defined between the upper wall 42b and the outer wall 42c, that is, the ridgeline 45a defined at an upper end of the outer wall 42c is set as an upper outer ridgeline 45a, and the ridgeline 45b defined between the outer wall 42c and the lower end flange 42d, that is, the ridgeline 45b defined at the lower end of the outer wall 42c is set as a lower outer ridgeline 45b.

In addition, as illustrated in FIG. 5 and FIG. 12, the outer wall 42c of the side sill 4 is provided with an outer wall bead 42cc, which is dented to the side of the closed cross-sectional space 4s, near a center in the vertical direction.

Figure 6:
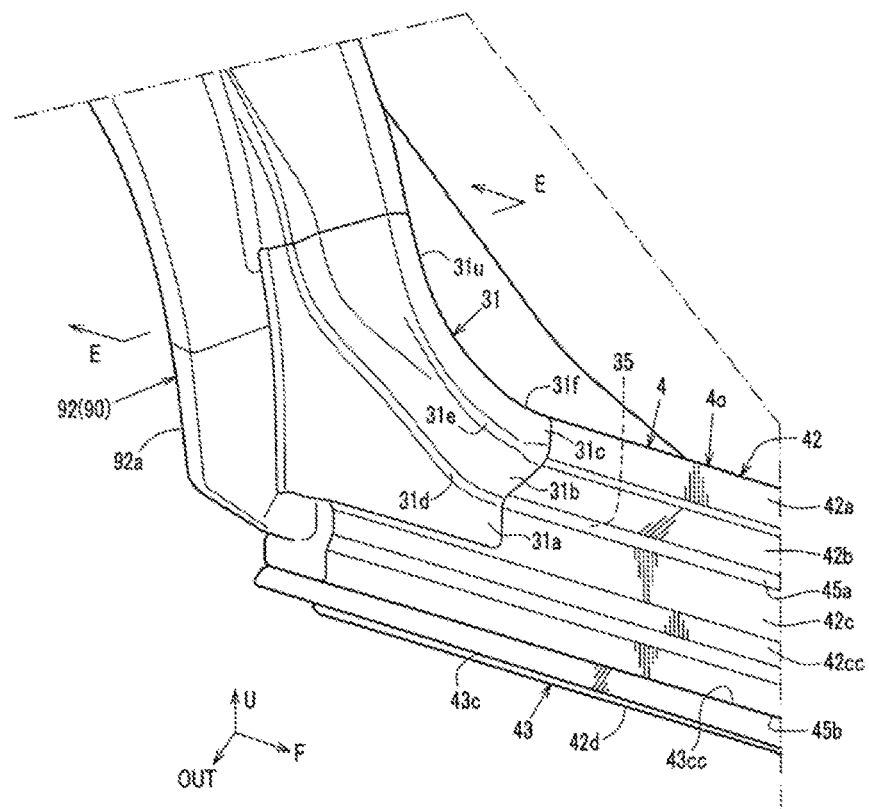
FIG. 6 is an enlarged view of the main section around the rear portion of the side sill in FIG. 1.

Furthermore, as illustrated in FIG. 5, FIG. 6, and FIG. 12, the third member 43 is further formed with a vehicle width outer end flange 43c extending toward the vehicle width outer side from a vehicle width outer end of the lower wall 43a. This vehicle width outer end flange 43c extends toward the vehicle width outer side from an upper end portion of an overlapping portion 46 between the lower end flange 42d of the second member 42 and the lower wall 43a of the third member 43.

In a cross-sectional view that is perpendicular to the longitudinal direction of the side sill 4, the vehicle width outer end flange 43c is projected downward and toward the vehicle width outer side from a position between the outer wall 42c and the lower wall 43a of the side sill 4 in a manner to be curved with respect to these outer wall 42c and lower wall 43a. In this way, a ridgeline 43cc extending in the vehicle longitudinal direction is defined in a base end portion of the vehicle width outer end flange 43c.

In the cross-sectional view that is perpendicular to the longitudinal direction of the side sill 4, this ridgeline 43cc matches or is located near the above-described lower outer ridgeline 45b. In the present example, the ridgeline 43cc located in the base end portion of the vehicle width outer end flange 43c is located under and near the lower outer ridgeline 45b.

Figure 9:
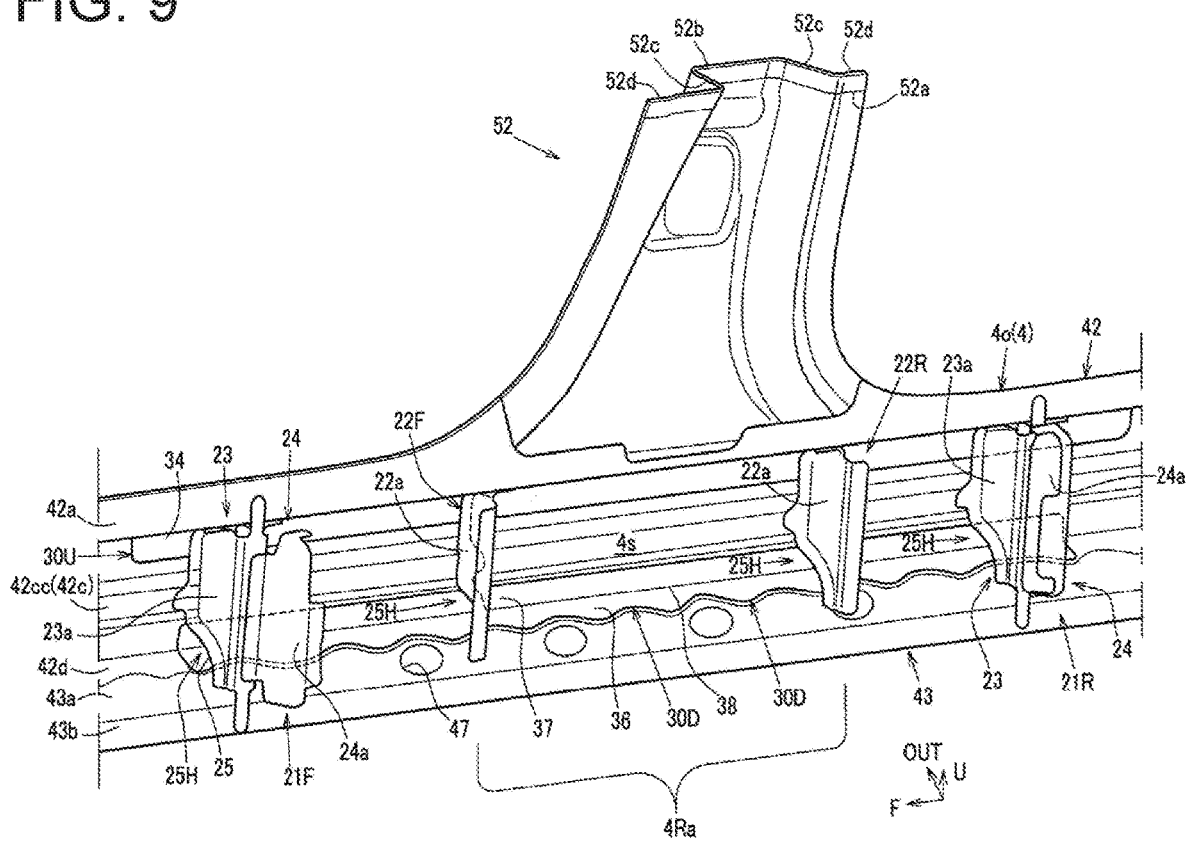
FIG. 9 is a perspective view in which a pillar inner is removed from FIG. 8.

Moreover, as illustrated in FIG. 9, the lower wall 43a of the third member 43 in the side sill 4 is formed with a plurality of through holes 47, each of which has a substantially circular shape in a plan view, along the vehicle longitudinal direction. Each of these through holes 47 is used to insert a corrosion inhibitor spray gun (not illustrated) in the closed cross-sectional space 4s in order to introduce an electrodeposition liquid or the like into the closed cross-sectional space 4s of the side sill 4 or spraying a corrosion inhibitor on an inner surface that faces the closed cross-sectional space 4s of the side sill 4.

By the way, as illustrated in FIG. 12, a floor panel 100, which is formed with an unillustrated tunnel portion raised upward in a central portion in the vehicle width direction and extending in the vehicle longitudinal direction is stretched between the above-described side sills 4 provided on both sides in a lower portion of a vehicle body. Furthermore, as illustrated in FIG. 11, in a rear end portion of the floor panel 100, a kick-up portion 101 is provided in a manner to be raised upward from the rear end portion.

Figure 11:
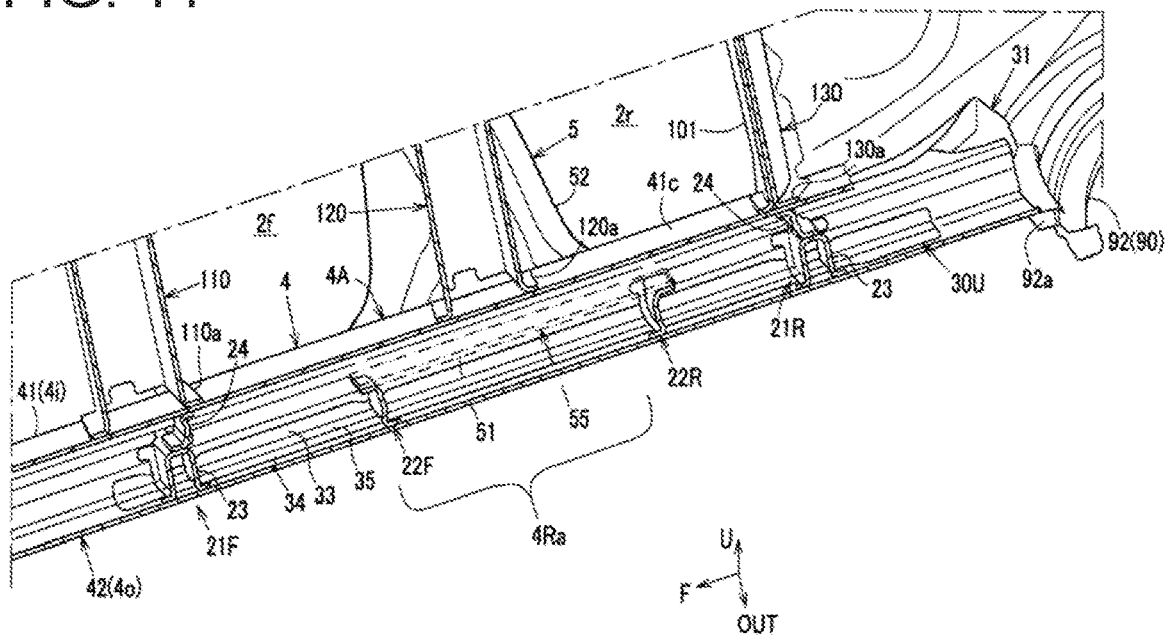
FIG. 11 is a cross-sectional view illustrating the main section taken along line B-B in
FIG. 2.

As illustrated in FIG. 11 and FIG. 12, a front crossmember 110 (a 2.0 crossmember) and an intermediate crossmember 120 (a 2.5 crossmember), each of which extends in the vehicle width direction and couples the side sill 4 and the tunnel portion, are disposed at positions on an upper surface of the floor panel 100 and both sides of the tunnel portion. The front crossmember 110 and the intermediate crossmember 120 are each formed to have a hat shape that is opened downward in the cross-sectional view that is perpendicular to the vehicle longitudinal direction and, with the floor panel 100, constitute a closed cross-sectional space extending in the vehicle width direction.

Furthermore, in an upper portion of the kick-up portion 101, a rear crossmember 130 (a 3.0 crossmember) that is joined and fixed to the upper portion from a back-surface side and has a closed cross-sectional space extending in the vehicle width direction is disposed.

These crossmembers 110, 120, 130 are disposed away from each other in the vehicle longitudinal direction. In the present example, in the vehicle longitudinal direction, the front crossmember 110 is disposed to be located in an intermediate portion of the front entry and exit opening 2f, the intermediate crossmember 120 is disposed to be located on the center pillar 5, and the rear crossmember 130 is disposed to be located in an intermediate portion of the rear entry and exit opening 2r.

As illustrated in FIG. 11, flanges 110a, 120a, 130a formed at outer ends in the vehicle width direction of these crossmembers 110, 120, 130 are joined to the inner wall 41c of the side sill 4 and can receive a load toward the vehicle width inner side transmitted from the side sill 4.

Figure 7:
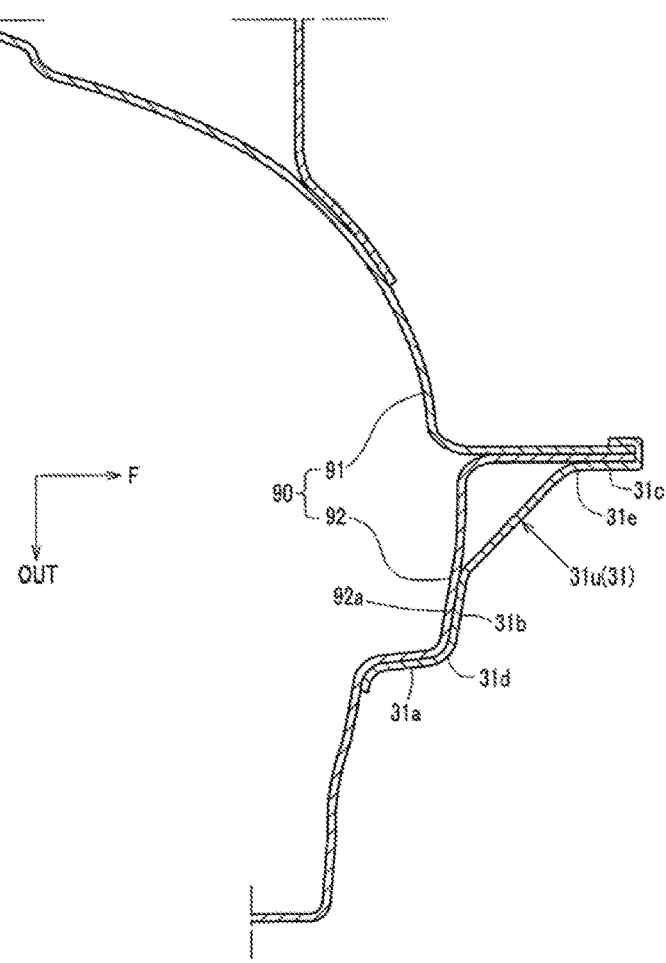
FIG. 7 is a cross-sectional view of the main section taken along line E-E in FIG. 6.

As illustrated in FIG. 1 to FIG. 3, a rear wheel house 90 that forms a rear portion of a lower side to a lower portion of a rear side of the rear entry and exit opening 2r is disposed behind the side sill 4. As illustrated in FIG. 7, the rear wheel house 90 includes a rear wheel house inner 91 and a rear wheel house outer 92, each of which is formed in an arch shape projected upward in the vehicle side view, and these accommodate a rear wheel from above.

As illustrated in FIG. 3 and FIG. 11, a front lower portion 92a of the rear wheel house outer 92 is joined to a rear end of the side sill 4.

As illustrated in FIG. 9 to FIG. 12, the side sill 4 includes sections 21F, 21R, 22F, 22R, each of which partitions the closed cross-sectional space 4s in the vehicle longitudinal direction.

The sections 21F, 21R, 22F, 22R are provided along the vehicle longitudinal direction of the side sill 4. In the present example, the sections 21F, 21R, 22F, 22R are at least provided at four positions in a front portion and a rear portion of a center pillar arrangement region 4Ra and a portion in front of and a portion behind the center pillar arrangement region 4Ra in the longitudinal direction of the side sill 4.

Note that the center pillar arrangement region 4Ra is located in the intermediate portion of the side sill 4 in the vehicle longitudinal direction.

These sections 21F, 21R, 22F, 22R are set as a pillar forward section 21F, a pillar front section 22F, a pillar rear section 22R, and a pillar rearward section 21R in an order from a front side to a rear side.

Figure 10:
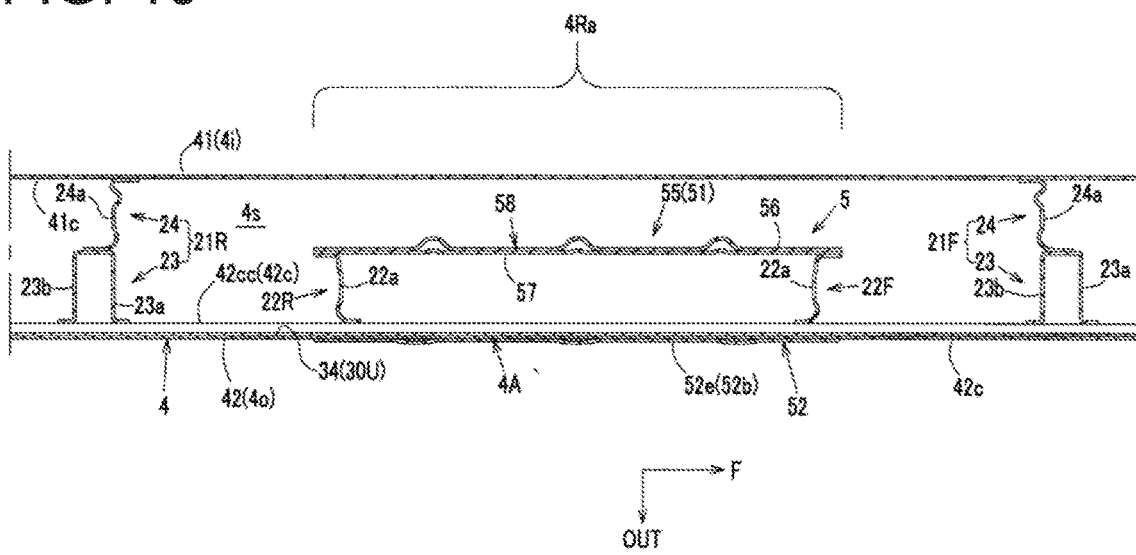
FIG. 10 is a cross-sectional view of the main section taken along line A-A in FIG. 2.

As illustrated in FIG. 9 and FIG. 10, the pillar front section 22F and the pillar rear section 22R each includes a vertical wall 22a that partitions the closed cross-sectional space 4s in the vehicle longitudinal direction. In addition, as illustrated in FIG. 9, FIG. 10, FIG. 11, and FIG. 12, the pillar forward section 21F and the pillar rearward section 21R are each constructed of an outer section component 23 located on the vehicle width outer side and an inner section component 24 located on the vehicle width inner side.

As illustrated in FIG. 10, the outer section component 23 includes a front wall 23a and a rear wall 23b separately disposed in the vehicle longitudinal direction, and the inner section component 24 includes a vertical wall 24a extending in the vertical direction and the vehicle width direction.

The above-described pillar front section 22F partitions the vehicle width outer side of the closed cross-sectional space 4s by the vertical wall 22a. The pillar forward section 21F partitions the vehicle width outer side of the closed cross-sectional space 4s by the front wall 23a and the rear wall 23b provided in the outer section component 23, and partitions the vehicle width inner side of the closed cross-sectional space 4s by the vertical wall 24a provided in the inner section component 24.

The side sill outer 4o, which is constructed of the second member 42 and the third member 43, is provided with first reinforcing members 30U, 30D and a second reinforcing member 31 that reinforce bending rigidity thereof against the load toward the vehicle width inner side.

As illustrated in FIG. 5, FIG. 9, and FIG. 12, the first reinforcing members 30U, 30D are the first upper reinforcing member 30U located in an upper portion of the side sill 4 and the first lower reinforcing member 30D located in a lower portion of the side sill 4.

As illustrated in FIG. 5, FIG. 8, FIG. 9, and FIG. 12, in the vertical direction of the outer wall 42c of the side sill, the above-described outer wall bead 42cc is provided at an intermediate position in the vertical direction between the first upper reinforcing member 30U and the first lower reinforcing member 30D.

As illustrated in FIG. 9 to FIG. 11, the first upper reinforcing member 30U is joined to the side sill 4 at a height position of a center pillar joined portion 4A.

The first upper reinforcing member 30U is integrally formed in a substantially L-shape in the cross-sectional view that is perpendicular to the vehicle longitudinal direction by a lateral side 33 (see FIG. 11 and FIG. 12) extending in the vehicle width direction along the upper wall 42b of the second member 42 in the side sill 4 and a vertical side 34 extending downward from a vehicle width outer end of the lateral side 33.

The first upper reinforcing member 30U is partially provided in the cross-sectional view that is perpendicular to the longitudinal direction of the side sill 4.

In detail, as illustrated in FIG. 5 and FIG. 12, the first upper reinforcing member 30U is joined to the side sill 4 in a manner to only cover the single ridgeline (the ridgeline 45a in the present example) among the plurality (four in the present example) of ridgelines 45a, 45b, 45c, 45d extending in the longitudinal direction of the side sill 4.

Further in detail, as illustrated in the same drawings, in a corner portion between the upper wall 42b and the outer wall 42c of the second member 42 in the side sill 4, the lateral side 33 and the vertical side 34 of the first upper reinforcing member 30U are respectively arranged on the upper wall 42b of the second member 42 and the outer wall 42c of the second member 42 from the side of the closed cross-sectional space 4s such that a ridgeline 35 provided between the lateral side 33 and the vertical side 34 abuts the upper outer ridgeline 45a provided in the corner portion, and the first upper reinforcing member 30U is joined at a plurality of positions along the vehicle longitudinal direction by welding or the like.

As illustrated in FIG. 1, FIG. 2, FIG. 10, and FIG. 12, the first lower reinforcing member 30D is joined to the side sill 4 at a position lower than the height position of the center pillar joined portion 4A.

In detail, as illustrated in FIG. 12, the first lower reinforcing member 30D is integrally formed in a substantially L-shape in the cross-sectional view that is perpendicular to the vehicle longitudinal direction by a lateral side 36 extending in the vehicle width direction along the lower wall 41d of the third member 43 in the side sill 4 and a vertical side 37 extending upward from a vehicle width outer end of the lateral side 36.

In a corner portion between the outer wall 42c of the second member 42 and the lower wall 43a of the third member 43 in the side sill 4, the vertical side 37 and the lateral side 36 of the first lower reinforcing member 30D are respectively joined to the outer wall 42c of the second member 42 and the lower wall 43a of the third member 43 via the lower end flange 42d of the second member 42 at a plurality of positions from the side of the closed cross-sectional space 4s along the vehicle longitudinal direction by welding or the like such that a ridgeline 38 between the vertical side 37 and the lateral side 36 abuts the lower outer ridgeline 45b provided in the corner portion.

As illustrated in FIG. 3, FIG. 5, and FIG. 9 to FIG. 12, each of these first upper reinforcing member 30U and first lower reinforcing member 30D continuously extends in the vehicle longitudinal direction from a position in front of the center pillar 5 to the rear portion of the side sill 4 in a manner to cross the center pillar 5 along the longitudinal direction of the side sill 4.

The first upper reinforcing member 30U will be described in detail. A front end of the first upper reinforcing member 30U extends to a position in front of the pillar forward section 21F as illustrated in FIG. 9 to FIG. 11 and also extends to a position where the first upper reinforcing member 30U overlaps the front crossmember 110 in the vehicle side view as illustrated in FIG. 11.

A rear end of the first upper reinforcing member 30U extends to a position behind the pillar rearward section 21R as illustrated in FIG. 9 and FIG. 11, and also extends to a position behind the rear crossmember 130 as illustrated in FIG. 11.

That is, in the vehicle longitudinal direction, first upper reinforcing member 30U is provided in a manner to cross the pillar forward section 21F, the pillar front section 22F, the pillar rear section 22R, and the pillar rearward section 21R, and is also provided in a manner to cross the crossmembers 110, 120, 130 on the front side, the intermediate side, and the rear side.

As illustrated in FIG. 1, FIG. 3, FIG. 4A, and FIG. 5 to FIG. 7, the above-described second reinforcing member 31 is provided in the rear portion of the side sill 4 and extends upward from the rear portion of the side sill 4 along the rear wheel house 90.

As illustrated in FIG. 6, the second reinforcing member 31 includes an upward extending portion 31u extending upward and a forward extending portion 31f extending forward. As illustrated in FIG. 5 to FIG. 7, in a corner portion between the front lower portion 92a of the rear wheel house outer 92 and the rear portion of the side sill 4 in the vehicle side view, the upward extending portion 31u and the forward extending portion 31f are respectively joined to the front lower portion 92a of the rear wheel house outer 92 and the rear portion of the side sill 4 by welding or the like.

In other words, as illustrated in FIG. 4A, FIG. 5, FIG. 6, and FIG. 7, the second reinforcing member 31 is integrally formed in a substantially triangular shape in the vehicle side view by a lateral wall 31a extending in the vertical direction and the vehicle longitudinal direction, a vertical wall 31b extending toward the vehicle width inner side from an upper edge of the side wall 31a, and a flange 31c extending upward from a vehicle width inner end of the vertical wall 31b.

In the second reinforcing member 31, ridgelines 31d, 31e continuously extending along an extending direction of the second reinforcing member 31 are respectively defined between the lateral wall 31a and the vertical wall 31b and between the vertical wall 31b and the flange 31c. These ridgelines 31d, 31e extend substantially along the vertical direction in the upward extending portion 31u, and extend substantially along the vehicle longitudinal direction in the forward extending portion 31f.

As illustrated in FIG. 6, the forward extending portion 31f of the second reinforcing member 31 is joined to the rear portion and the upper portion of the side sill 4 from the vehicle width outer side. More specifically, as illustrated in FIG. 5 and FIG. 6, in the second reinforcing member 31, the flange 31c of the forward extending portion 31f and the lateral wall 31a of the forward extending portion 31f are respectively joined to the upper end flange 42a of the second member 42 and the outer wall 42c of the second member 42 in the side sill 4 in a manner to cover the upper end flange 42a and the outer wall 42c from the vehicle width outer side, and the vertical wall 31b of the forward extending portion 31f is joined to the upper wall 42b of the second member 42 in a manner to cover the upper wall 42b from above.

In this way, as illustrated in FIG. 3, FIGS. 4A, 4B, and FIG. 5, in the rear portion of the side sill 4, a front portion of the second reinforcing member 31, that is, the forward extending portion 3 if is located on the vehicle width outer side of a rear portion of the first upper reinforcing member 30U and overlaps the rear portion of the first upper reinforcing member 30U in the vehicle side view (that is, in the vehicle width direction).

Figure 4A:
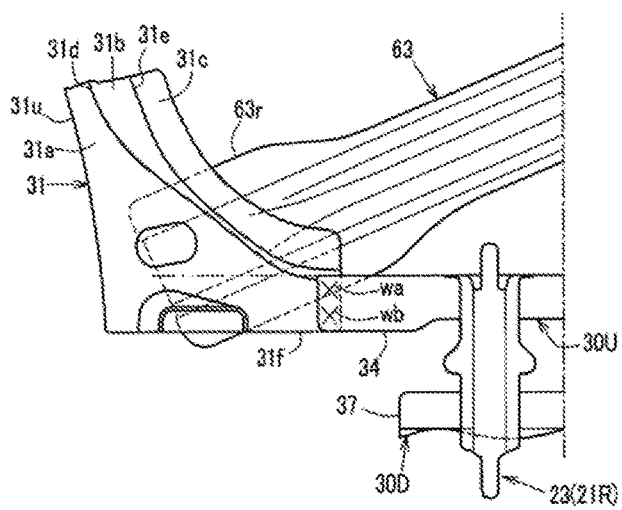
FIG. 4A is an enlarged view of the main section in which a side sill outer and a rear wheel house are removed from FIG. 3.
Figure 4B:
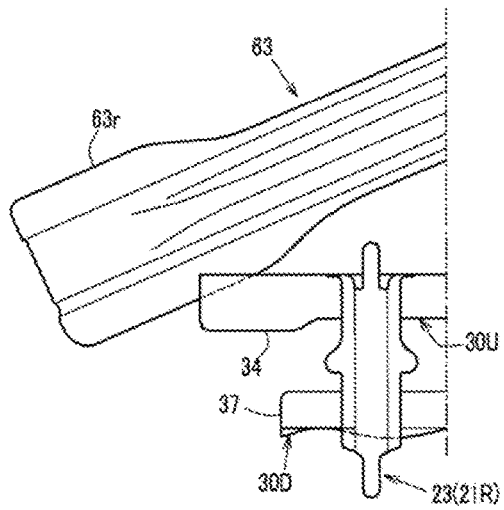
FIG. 4B is an enlarged view of the main section in which a second reinforcing member is further removed therefrom.

Furthermore, as illustrated in FIG. 3, FIG. 4A, and FIG. 5, in the rear portion of the side sill 4, the second reinforcing member 31 overlaps a rear end flange 63r of the impact bar 63 in the vehicle side view.

More specifically, when the rear side door 6 is closed, as described above, the rear end flange 63r of the impact bar 63, which is provided in the lower portion of the rear side door 6, overlaps the rear portion of the side sill 4 in the vehicle side view. Accordingly, as illustrated in FIG. 3, FIGS. 4A, 4B, and FIG. 5, in the rear portion of the side sill 4, the rear end flange 63r of the impact bar 63, the forward extending portion 31f of the second reinforcing member 31, the second member 42 of the side sill 4, and the rear portion of the first upper reinforcing member 30U are sequentially provided from the outer side to the inner side in the vehicle width direction, and these overlap each other in the vehicle side view.

In the present example, in an overlapping portion of the second reinforcing member 31, the second member 42 of the side sill 4, and the first upper reinforcing member 30U, these three pieces are integrally joined to each other by spot welding. In FIG. 3 and FIG. 4A, an "x" represents joined positions wa, wb.

In other words, as illustrated in FIG. 5, the second reinforcing member 31 and the first upper reinforcing member 30U are joined to each other at the joined positions wa, wb in a manner to hold the second member 42 of the side sill 4 therebetween.

As illustrated in FIG. 4A, the rear end flange 63r of the impact bar 63 overlaps the joined portion (at least the joined position wa) between the second reinforcing member 31 and the first upper reinforcing member 30U in the vehicle side view.

In addition, as illustrated in FIG. 5 and FIG. 12, the ridgeline 35 defined between the lateral side 33 and the vertical side 34 of the first upper reinforcing member 30U extends for an entire length of the first upper reinforcing member 30U in the vehicle longitudinal direction.

Meanwhile, as illustrated in FIG. 4A and FIG. 6, as described above, the ridgelines 31d, 31e of the second reinforcing member 31 extend substantially along the vertical direction in the upward extending portion 31u located in the rear portion of the second reinforcing member 31, and also extend substantially along the vehicle longitudinal direction in the forward extending portion 31f located in the front portion of the second reinforcing member 31.

In the present example, a rear portion of the ridgeline 35 extending in the longitudinal direction and lower portions (front portions) of the ridgelines 31d, 31e extending in the vertical direction are defined to continue in the vehicle side view (see FIG. 4A, FIG. 5, FIG. 6, and FIG. 12).

Figure 8:
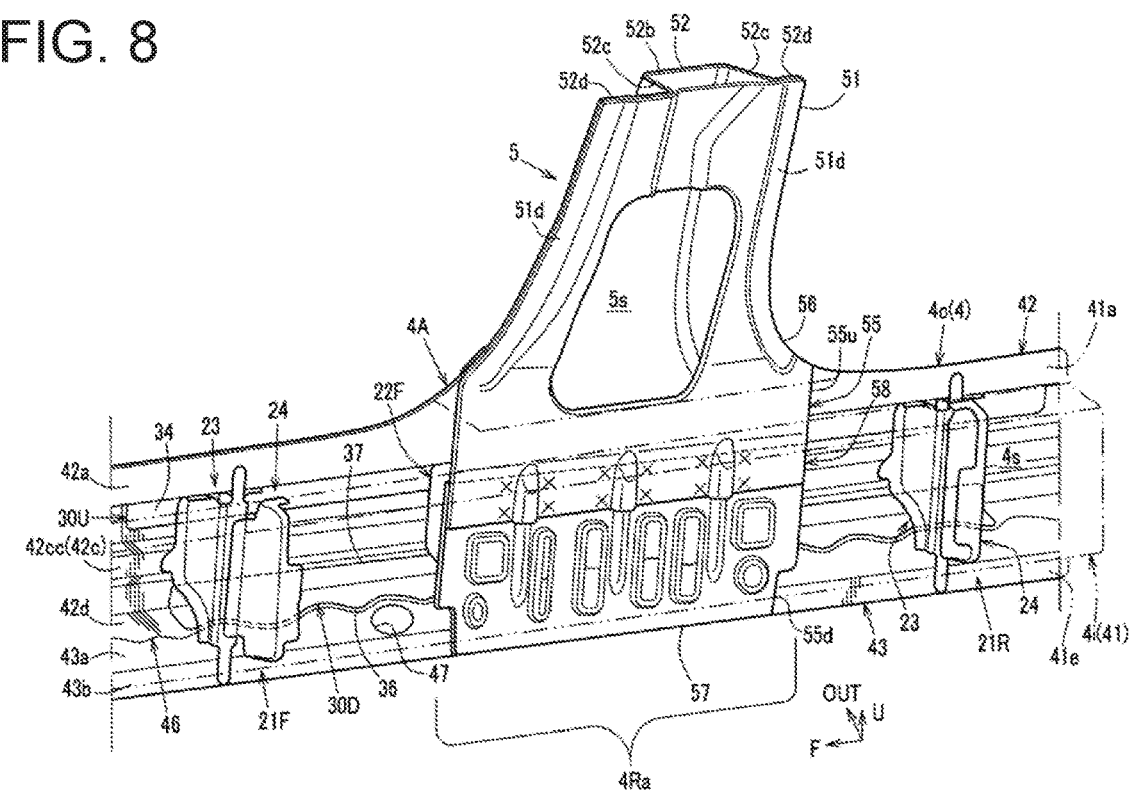
FIG. 8 is a perspective view in which a side sill inner is removed and a joined portion between the side sill and a center pillar and a portion therearound are seen from the vehicle width inner side.

As illustrated in FIG. 1, FIG. 8, and FIG. 9, the above-described center pillar 5 includes a pillar inner 51 and a pillar outer 52 and is vertically provided from the side sill 4 by joining lower portions of these to the side sill 4. A lower portion of the center pillar 5 (a root region for the side sill 4) is formed such that a width thereof in the vehicle longitudinal direction is gradually increased downward from a portion near an upper end 52a (see FIG. 1, FIG. 2, and FIG. 9) of the lower portion to the upper end of the side sill 4.

As illustrated in FIG. 8, the pillar inner 51 is formed in a vertical wall shape (a substantially flat plate shape) in which the substantially entire portion in the vertical direction extends in the vehicle width direction, and is formed with a flange 51d on each of front and rear sides thereof.

As illustrated in FIG. 1, FIG. 8, and FIG. 9, the pillar outer 52 is integrally formed by including an outer wall 52b extending in the vertical direction and the vehicle width direction, front and rear vertical walls 52c extending toward the vehicle width inner side from front and rear ends of the outer wall 52b, a flange 52d on each of the front and rear sides formed along the vertical wall 52c such that the substantially entire portion in the vertical direction has a hat-shaped cross-sectional shape opened to the vehicle width inner side in the cross-sectional view that is perpendicular to the vertical direction.

The center pillar 5 is configured to have a closed cross-sectional space 5s extending in the vertical direction between the pillar inner 51 and the pillar outer 52 by joining the front edge flanges 51d, 52d and the rear edge flanges 51d, 52d of the pillar inner 51 and the pillar outer 52.

A lower portion of the pillar outer 52 is joined to the second member 42 of the side sill 4, and this joint structure will be described.

As illustrated in FIG. 1, FIG. 2, and FIG. 10, the lower portion of the pillar outer 52 is formed with a lower end flange 52e extending downward from a lower end of the outer wall 52b, and this lower end flange 52e is joined to the outer wall 42c of the second member 42 in the side sill 4. In this way, as illustrated in FIG. 1 and FIG. 10, the outer wall 52b of the center pillar 5 and the outer wall 42c of the side sill 4 are arranged to be substantially flush in the vehicle width direction. In addition, each of the front and rear flanges 52d of the pillar outer 52 and each of the front and rear flanges 51d of the pillar inner 51 are integrally joined to each other as described above. As illustrated in FIG. 8, lower portions of these flanges 51d, 52d on each of the front and rear sides are integrally joined to each other in a state of holding the upper end flange 42a of the second member 42 on a side of the side sill outer 4o from both of the inner and outer sides in the vehicle width direction. In this way, the front and rear flanges 51d, 52d of the center pillar 5 and the upper end flange 42a of the side sill 4 are arranged to be substantially flush in the vehicle width direction.

In this state, as illustrated in FIG. 1, the vertical wall 52c on each of the front and rear sides of the pillar outer 52 is brought into a state where a lower end thereof contacts the upper wall 42b of the second member 42 in the side sill 4, and each of the front and rear vertical walls 52c extending in the vertical direction and the upper wall 42b, which extends in the longitudinal direction, in the second member 42 of the side sill 4 continuously and smoothly extend in a corner portion of these in the vehicle side view.

The pillar inner 51 is formed such that the lower portion is widened in the vehicle longitudinal direction so as to correspond to the lower portion of the pillar outer 52, and is formed with an extending portion 55 that extends to be lower than a position of the upper end of the side sill 4.

More specifically, in the center pillar arrangement region 4Ra in the vehicle longitudinal direction of the side sill 4, as illustrated in FIG. 8 and FIG. 10, the extending portion 55 is disposed in the closed cross-sectional space 4s in a manner to partition the closed cross-sectional space 4s into spaces on the inner and outer sides in the vehicle width direction. As illustrated in FIG. 8, an upper end 55u of the extending portion 55 is interposed between the upper end flanges 41a, 42a of the first member 41 and the second member 42 in the side sill 4 and is integrally joined to these upper end flanges 41a, 42a. Furthermore, a lower end 55d of the extending portion 55 is interposed between the lower end flanges 41e, 43b of the first member 41 and the third member 43 in the side sill 4 and is integrally joined to these lower end flanges 41e, 43b.

Note that as described above, the lower portion of the pillar inner 51 including the extending portion 55 is formed to be widened in the vehicle longitudinal direction.

In addition, as illustrated in FIG. 8, the pillar inner 51 has two members that are a pillar inner upper 56 and a pillar inner lower 57 provided below the pillar inner upper 56. A lower portion of the pillar inner upper 56 and an upper portion of the pillar inner lower 57 overlap each other in the vehicle width direction in the closed cross-sectional space 4s of the side sill 4. That is, as illustrated in FIG. 8 and FIG. 10, an overlapping portion 58 between the lower portion of the pillar inner upper 56 and the upper portion of the pillar inner lower 57 is provided in the above-described extending portion 55, and the lower portion of the pillar inner upper 56 and the upper portion of the pillar inner lower 57 are joined to each other at a plurality of positions along the vehicle longitudinal direction of the extending portion 55 by spot welding or the like (indicated by an "x" in FIG. 8).

As illustrated in FIG. 10, in the closed cross-sectional space 4s of the side sill 4, the pillar front section 22F and the pillar rear section 22R described above are provided on the vehicle width outer side of the extending portion 55. The pillar front section 22F and the pillar rear section 22R are respectively provided on a front end side of the extending portion 55 and a rear end side of the extending portion 55 in a manner to separate from each other in the vehicle longitudinal direction.

As illustrated in FIG. 1 and FIG. 2, the vehicle side body structure according to this embodiment described above is the vehicle side body structure including: the side sill 4 that has the closed cross-sectional space 4s (see FIG. 5) (the closed cross-sectional structure) extending in the vehicle longitudinal direction; and the center pillar 5 that has the closed cross-sectional space 5s (see FIG. 8) (the closed cross-sectional structure) extending upward from the side sill 4, and being formed with the front and rear entry and exit openings 2f, 2r that are openings provided at positions above the side sill 4 and in front of and behind the center pillar 5. As illustrated in FIG. 3, FIGS. 4A, 4B, FIG. 5, and FIG. 9 to FIG. 12, the side sill 4 includes the first upper reinforcing member 30U that is the reinforcing member for reinforcing the bending rigidity against the load toward the vehicle width inner side. The first upper reinforcing member 30U is partially provided in the cross-sectional view that is perpendicular to the longitudinal direction of the side sill 4 (the vehicle longitudinal direction), and extends along the longitudinal direction of the side sill 4 such that at least a part thereof overlaps the center pillar joined portion 4A in the vehicle side view at the height position of the center pillar joined portion 4A, to which the center pillar 5 is joined (see FIG. 9 to FIG. 12).

With the above configuration, the first upper reinforcing member 30U is provided in the upper portion of the side sill 4 in the vertical direction corresponding to the height position of the center pillar joined portion 4A. In this way, it is possible to efficiently improve the bending rigidity of the upper portion of the side sill 4 in comparison with the lower portion thereof, so as to prevent bending deformation of the side sill 4 toward the vehicle width inner side, which is caused when the side sill 4 is pulled by the center pillar 5 due to the load toward the vehicle width inner side applied to the side sill 4 from the center pillar 5 during the lateral collision.

Furthermore, since the first upper reinforcing member 30U extends along the longitudinal direction of the side sill 4 so as to overlap the center pillar joined portion 4A in the vehicle side view, the load toward the vehicle width inner side, which is applied to the center pillar joined portion 4A of the side sill 4, can efficiently be received and dispersed in a wide area along the longitudinal direction of the side sill 4. In this way, it is possible to further improve the bending rigidity against the load toward the vehicle width inner side.

Moreover, the first upper reinforcing member 30U is partially provided in the upper portion of the side sill 4 in the cross-sectional view that is perpendicular to the longitudinal direction of the side sill 4. Thus, it is possible to suppress a weight increase of the side sill 4 while providing the side sill 4 with a minimum reinforcement against the load toward the vehicle width inner side during the lateral collision.

Therefore, it is possible to improve the bending rigidity of the side sill 4 against the load toward the vehicle width inner side during the lateral collision while suppressing the weight increase of the side sill 4 by providing the minimum reinforcement.

As an aspect of the present invention, as illustrated in FIG. 11 and FIG. 12, the crossmembers 110, 120, 130 extending toward the vehicle width inner side from the side sill 4 and separating from each other in the vehicle longitudinal direction are provided. In the closed cross-sectional space 4s on the inside of the side sill 4, the sections 21F, 21R, 22F, 22R, each of which partitions the closed cross-sectional space 4s in the longitudinal direction, are at least provided in the upper portion of the side sill 4 corresponding to the height of the center pillar joined portion 4A. The first upper reinforcing member 30U is provided in the manner to cross the crossmembers 110, 120, 130 and the sections 21F, 21R, 22F, 22R (see FIG. 11).

In the closed cross-sectional space 4s, the sections 21F, 21R, 22F, 22R are provided in the upper portion corresponding to the height of the center pillar joined portion 4A, that is, at the same height as the first upper reinforcing member 30U. Accordingly, when the first upper reinforcing member 30U receives the load toward the inner side in the vehicle width direction, which is applied to the side sill 4 from the center pillar 5 during the lateral collision, the crossmembers 110, 120, 130 can also receive the load via the sections 21F, 21R, 22F, 22R.

Therefore, it is possible to suppress the weight increase of the side sill 4 while improving a reinforcing effect on the side sill 4 by the first upper reinforcing member 30U by using the crossmembers 110, 120, 130 as the existing vehicle body rigid members.

In detail, as illustrated in FIG. 9 and FIG. 12, the sections 21F, 21R, 22F, 22R are provided on the inside of the side sill 4. Each of these sections 21F, 21R, 22F, 22R has a recessed clearance portion 25 in a lower portion thereof, so as to secure a communicating portion 25H, through which the corrosion inhibitor can flow in the longitudinal direction of the closed cross-sectional space 4s, between each of the sections 21F, 21R, 22F, 22R and the inner surface in the lower portion of the side sill 4.

Meanwhile, each of the sections 21F, 21R, 22F, 22R is disposed at a position where the upper portion thereof abuts or is located near the upper portion of the side sill 4, that is, the first upper reinforcing member 30U. Thus, upon manufacturing of the vehicle, the communicating portion 25H is secured to allow the flow of the corrosion inhibitor in the longitudinal direction of the closed cross-sectional space 4s. Meanwhile, the crossmembers 110, 120, 130 can receive the inward load in the vehicle width direction via the sections 21F, 21R, 22F, 22R during the lateral collision, so as to prevent the displacement of the first upper reinforcing member 30U toward the vehicle width inner side. Therefore, it is possible to efficiently improve the bending rigidity of the side sill 4.

As an aspect of the present invention, the center pillar 5 is joined to the side sill 4 at the position among the crossmembers 110, 120, 130 in the vehicle longitudinal direction, that is, between the front crossmember 110 and the rear crossmember 130 while overlapping the intermediate crossmember 120 (see FIG. 11 and FIG. 12).

With the above configuration, the center pillar 5 can receive and disperse the load toward the vehicle width inner side, which is applied to the side sill 4 from the center pillar 5 during the lateral collision, by the center pillar 5 provided on each of the front and rear sides of the center pillar 5 in the well-balanced manner. Therefore, it is possible to improve the bending rigidity of the first upper reinforcing member 30U by using rigidity of the crossmembers 110, 120, 130 provided on the front and rear sides of the center pillar 5.

As an aspect of the present invention, the first upper reinforcing member 30U is formed such that the cross section that is perpendicular to the vehicle longitudinal direction is L-shaped (see FIG. 5, FIG. 11, and FIG. 12).

With the above configuration, since the first upper reinforcing member 30U is formed in the L-shape, the ridgeline 35 extending in the vehicle longitudinal direction can be defined. Thus, compared to a shape that extends in a flat plate shape, for example, it is possible to improve the bending rigidity of the side sill 4 against the load toward the vehicle width inner side during the lateral collision.

In particular, the bending rigidity of the first upper reinforcing member 30 against the load toward the vehicle width inner side can efficiently be improved by providing the lateral side 33 in a horizontal surface shape that extends in the vehicle width direction.

As an aspect of the present invention, the first upper reinforcing member 30U is formed by covering the upper outer ridgeline 45a (the ridgeline) extending in the longitudinal direction and defined in the side sill 4 from the side of the closed cross-sectional space 4s of the side sill 4 in the cross-sectional view that is perpendicular to the longitudinal direction of the side sill 4 (see FIG. 5 and FIG. 12).

With the above configuration, the upper outer ridgeline 45a of the side sill 4 is covered with the first upper reinforcing member 30U. In this way, of the ridgelines 45a, 45b, 45c, 45d, each of which has the high bending rigidity against the load during the lateral collision, in the side sill 4, the first upper reinforcing member 30U can overlap the upper outer ridgeline 45a in the vehicle side view. Thus, it is possible to improve the reinforcing effect of the bending rigidity of the side sill 4 against the load during the lateral collision by the first upper reinforcing member 30U.

As an aspect of the present invention, the reinforcing member is set as the first upper reinforcing member 30U (the first reinforcing member), and the reinforcing member includes the second reinforcing member 31, which extends upward from the rear portion of the side sill 4, in the rear portion thereof (see FIG. 1 and FIG. 6). The rear portion of the first upper reinforcing member 30U overlaps the second reinforcing member 31 in the vehicle side view (see FIG. 3 to FIG. 5).

With the above configuration, the first upper reinforcing member 30U can receive the lateral collision load in cooperation with the second reinforcing member 31 and can disperse the received load toward a side of the second reinforcing member 31, that is, toward a side of the rear wheel house 90. Therefore, it is possible to improve the bending rigidity of the side sill 4.

The present invention is not limited to the configuration in the above-described embodiment, but can be implemented in various embodiments.

DESCRIPTION OF REFERENCE CHARACTERS 2f, 2r: Entry and exit opening (opening)
4: Side sill
4A: Center pillar joined portion
4s: Closed cross-sectional space (closed cross-sectional structure)
5: Center pillar
5s: Closed cross-sectional space (closed cross-sectional structure)
21F,21R,22F,22R: Section
30U: First upper reinforcing member (reinforcing member, first reinforcing member)
31: Second reinforcing member (reinforcing member, second reinforcing member)
45a: Upper outer ridgeline (ridgeline)
110,120,13: Crossmember

The invention claimed is:

1. A vehicle side body structure, comprising:
a side sill that has a closed cross-sectional structure extending in a vehicle longitudinal direction; and
a center pillar that has a closed cross-sectional structure extending upward from the side sill, and being formed with an opening at a position above the side sill and each of front and rear sides of the center pillar, wherein
the side sill includes a reinforcing member that reinforces bending rigidity against a load toward an inner side in a vehicle width direction,
the reinforcing member is partially provided in a cross-sectional view that is perpendicular to a longitudinal direction of the side sill, and extends along the longitudinal direction of the side sill such that at least a part thereof overlaps a center pillar joined portion, to which the center pillar is joined, in a vehicle side view at a height position of the center pillar joined portion,
the reinforcing member comprises a lateral side extending in the vehicle width direction and a vertical side extending downward from a vehicle width outer end of the lateral side, the lateral side integrally formed with the vertical side,
a cross section of the reinforcing member that is perpendicular to the vehicle longitudinal direction has an L-shape,
the reinforcing member is joined to a corner portion of the side sill, such that a reinforcing ridgeline of the reinforcing member provided between the lateral side and the vertical side abuts a ridgeline of the side sill provided in the corner portion, and
the reinforcing member comprises an upper reinforcing member provided at an upper portion of the side sill and a lower reinforcing member provided at a lower portion of the side sill.

2. The vehicle side body structure according to claim 1 further comprising:
a plurality of crossmembers extending toward the inner side in the vehicle width direction from the side sill and separating from each other in the vehicle longitudinal direction; and
in a closed cross-sectional space on the inside of the side sill, a section that partitions the closed cross-sectional space in a longitudinal direction at least in the upper portion corresponding to a height of the center pillar joined portion, wherein
the reinforcing member is provided across the crossmembers and the section.

3. The vehicle side body structure according to claim 2, wherein
the center pillar is joined to a portion of the side sill between the crossmembers in a vehicle body longitudinal direction.

4. The vehicle side body structure according to claim 1, wherein
the reinforcing member covers the ridgeline formed in the side sill and extending in the longitudinal direction from an internal space side of the side sill or from an outer side of the internal space in a cross-sectional view that is perpendicular to the longitudinal direction of the side sill.

5. The vehicle side body structure according to claim 2, wherein
the reinforcing member covers the ridgeline formed in the side sill and extending in the longitudinal direction from an internal space side of the side sill or from an outer side of the internal space in a cross-sectional view that is perpendicular to the longitudinal direction of the side sill.

6. The vehicle side body structure according to claim 3, wherein
the reinforcing member covers the ridgeline formed in the side sill and extending in the longitudinal direction from an internal space side of the side sill or from an outer side of the internal space in a cross-sectional view that is perpendicular to the longitudinal direction of the side sill.

7. The vehicle side body structure according to claim 1, wherein
the reinforcing member is a first reinforcing member,
the side sill includes a second reinforcing member, which extends upward from a rear portion of the side sill, in the rear portion thereof, and
a rear portion of the first reinforcing member overlaps the second reinforcing member in the vehicle side view.

8. A vehicle side body structure, comprising:
a side sill that has a closed cross-sectional structure extending in a vehicle longitudinal direction; and
a center pillar that has a closed cross-sectional structure extending upward from the side sill, and being formed with an opening at a position above the side sill and each of front and rear sides of the center pillar, wherein
the side sill includes a reinforcing member that reinforces bending rigidity against a load toward an inner side in a vehicle width direction,
the reinforcing member is partially provided in a cross-sectional view that is perpendicular to a longitudinal direction of the side sill, and extends along the longitudinal direction of the side sill such that at least a part thereof overlaps a center pillar joined portion, to which the center pillar is joined, in a vehicle side view at a height position of the center pillar joined portion,
the reinforcing member comprises a lateral side extending in the vehicle width direction and a vertical side extending downward from a vehicle width outer end of the lateral side, the lateral side integrally formed with the vertical side,
a cross section of the reinforcing member that is perpendicular to the vehicle longitudinal direction has an L-shape,
the reinforcing member is joined to a corner portion of the side sill, such that a reinforcing ridgeline of the reinforcing member provided between the lateral side and the vertical side abuts a ridgeline of the side sill provided in the corner portion,
the reinforcing member comprises an upper reinforcing member provided at an upper portion of the side sill and a lower reinforcing member provided at a lower portion of the side sill, and
an outer wall bead is provided at an intermediate position in a vertical direction at an outer wall of the side sill between the upper reinforcing member and the lower reinforcing member.

9. The vehicle side body structure according to claim 6, wherein
the reinforcing member extends across a pillar forward section, a pillar front section, a pillar rear section, and a pillar rearward section of the side sill in the vehicle longitudinal direction.

* * * * *